(12) United States Patent
Wiechman

(10) Patent No.: US 8,383,935 B1
(45) Date of Patent: Feb. 26, 2013

(54) WELLHEAD ADAPTER

(76) Inventor: Jeff Wiechman, Wichita, KS (US)

( * ) Notice: Subject to any disclaimer, the term of this patent is extended or adjusted under 35 U.S.C. 154(b) by 288 days.

(21) Appl. No.: 12/946,279

(22) Filed: Nov. 15, 2010

(51) Int. Cl.
*H02G 3/08* (2006.01)

(52) U.S. Cl. ............. 174/50; 174/482; 174/58; 220/3.2; 220/3.3; 220/4.02

(58) Field of Classification Search .................... 174/50, 174/53, 57, 58, 37, 482, 483, 487, 490, 559, 174/17 R; 220/3.2–3.9, 4.02; 248/906; 166/335, 166/350
See application file for complete search history.

(56) References Cited

U.S. PATENT DOCUMENTS

| 6,483,031 | B2 * | 11/2002 | O'Donnell ....................... 174/58 |
| 6,593,525 | B1 * | 7/2003 | Vanderhoof et al. ............. 174/50 |
| 6,940,016 | B1 * | 9/2005 | Cornett et al. ................... 174/58 |
| 7,714,227 | B2 * | 5/2010 | Sparrowhawk et al. ........ 174/50 |

* cited by examiner

*Primary Examiner* — Angel R Estrada
(74) *Attorney, Agent, or Firm* — Kenneth H. Jack; Davis & Jack, LLC

(57) ABSTRACT

An adapter for a wellhead, the well having a casing and a submersible electric pump mounted within the casing, the casing having an upper end and an upwardly opening bore, the adapter including a base plate having forward and rearward ends, the base plate's rearward end being fitted for mounting over the casing's upper end and having a bore opening aperture therethrough, the base plate's forward end being forwardly oblongated and having a wire passage aperture therethrough; an annular case retaining flange having forward and rearward ends, the annular case retaining flange being fixedly attached to and extending downwardly from the base plate; a switch box having a ceiling, a floor, a left wall, a right wall, and a rear wall, the ceiling incorporating the base plate's forward end and the rear wall incorporating the annular case retaining flange's forward end.

11 Claims, 2 Drawing Sheets

WELLHEAD ADAPTER

FIELD OF THE INVENTION

This invention relates to cased water wells having submersible electric pumps. More particularly, this invention relates to electrical component adapters fitted for attachment to upper ends of such well cases.

BACKGROUND OF THE INVENTION

Conventional adapters for attachment to the upper end of a cased water well including a submersible electric water pump typically include structures which are well capable of simultaneously functioning for covering the wellhead and for routing electric power cables over the upper lip of the wellhead and into the wellhead's bore. Such adapters are often found to be deficient or unsatisfactory in view of advancing building codes and governmental regulations relating to such submersible electric pump water wells which require mounting of an electric circuit breaking switch at a location which is close to the wellhead. Where such conventional wellhead adapters are provided, such needed electric circuit breaking switches are difficulty and inconveniently installed. Upon installation, such electric circuit breaking switches are typically improperly and insufficiently structurally supported.

The instant inventive wellhead adaptor solves or ameliorates the problems and deficiencies discussed above by specially adapting structures common to conventionally known wellhead adapters for dually or additionally performing functions for service as an electrical switch box.

BRIEF SUMMARY OF THE INVENTION

The instant inventive wellhead adapter is intended for use with, installation upon, and for service as an adapter for a wellhead of a cased water well. In the typical mode of usage of the inventive adapter, the cased water well includes a submersible electric water pump mounted at a lower end of a column pipe, such pump being suspended at a lower end of the well's casing.

A first structural component of the instant wellhead adapter comprises a base plate having forward and rearward ends. In the preferred embodiment, the base plate's rearward end is substantially circular, and is sized and fitted for mounting over the well casing's upper opening. Also in the preferred embodiment, the base plate's rearward end has a central well bore opening aperture therethrough for well bore access.

In the preferred embodiment, the base plate's forward end is forwardly and non-circularly oblongated, the forwardly directed protrusion of the base plate's forward end extending that end of the base plate a distance away from the outer periphery of the casing sufficient to allow such base plate forward end to simultaneously perform multiple functions including service as an adapter base support member, service as a switch box ceiling component, service as a wire conduit floor component, and service as switch box side wall mounting and suspending lands. In the preferred embodiment of the instant inventive adapter, such base plate's forward end has a vertically extending wire passage aperture therethrough.

A further structural component of the instant inventive wellhead adapter comprises an annular case retaining flange which is fixedly attached to and extends downwardly from both the base plate's rearward end and a rearward aspect of the base plate's forward protrusion. In the preferred embodiment, such flange component is adapted for performing multiple functions including casing mounting and retention, service as a switch box rear wall, and service as a switch box side wall mounting lands.

A further structural component of the instant inventive wellhead adapter comprises the switch box referenced above, such box having the ceiling referenced above, a floor, the left and right side walls referenced above, and the rear wall referenced above. In the preferred embodiment, the switch box's rear wall comprises and incorporates a partial circumferential segment or portion of the annular case retaining flange, such segment residing at such flange's forward end. Left and right ends of such forwardly situated partial circumferential segment advantageously serve as mounting points or lands for attached support of the rearward ends of the switch box's left and right side walls. The fixed attachments of those walls with such flange preferably comprise wholly formed joints. Similarly, upper ends of the switch box's left and right walls are preferably fixedly attached, preferably via wholly formed joints, to the undersurface of the base plate's forward extension. Accordingly, the left and right ends of such extension advantageously function along with the casing retaining flange as box wall mounting points.

A further structural component of the instant inventive wellhead adapter comprises a specially configured cover plate which has forward and rearward ends which are respectively fitted for covering the base plate's forward and rearward ends. The lower surface or lower aspect of the forward end of the cover plate preferably forms and defines an upper portion of a wire passage conduit for wire extension and electrical communication between the wire passage aperture within the base's plate forward end and the bore opening aperture within the base plate's rearward end.

In a preferred embodiment, the switch box is preferably further opened at the box's floor, such further opening comprising an internally helically threaded wire conduit receiving port. Such threaded port preferably receives a matchingly threaded upper end of a length of PVC electrical conduit. A strap mounted single throw electric switch is preferably mounted upon and within the switch box, the switch's strap preferably being mounted by screws to span across the switch box's forward opening. A cover plate is preferably provided, the mounting screws securely and removably holding both the strap mounted single throw switch and the cover plate over the forward opening of the switch box.

A network of electric power and ground wires or cables preferably extend through the PVC conduit (which typically extends underground to the wellhead and emerges at the wellhead), into the switch box through its conduit receiving port, through the interior of the switch box where the electrical switch is electrically incorporated within the network, thence upwardly through the wire passage aperture within the base plate forward end/box ceiling component, thence rearwardly through the wire conduit which is upwardly defined by the lower aspect of the forward end of the cover plate and which is downwardly defined by the upper surface of the base plate forward end/box ceiling component, and thence downwardly through the base plate's bore opening aperture, to enter the hollow bore of the well's casing. Such electrical cable may then extend further downwardly along the well's column pipe to provide electric power to the suspended submersible electric pump.

In use and operation of the inventive wellhead adapter, a switch box is advantageously provided and is securely mounted at the wellhead, such provision and mount being achieved with mechanical simplicity and economy through adaptations of plate and flange structures for service in multiple functions, as described above.

Accordingly, it is an object of the instant invention to provide a wellhead adapter which includes structures and components, as described above, and which arranges those structures and components with respect to each other, as described above, for the performance of beneficial functions, as described above.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
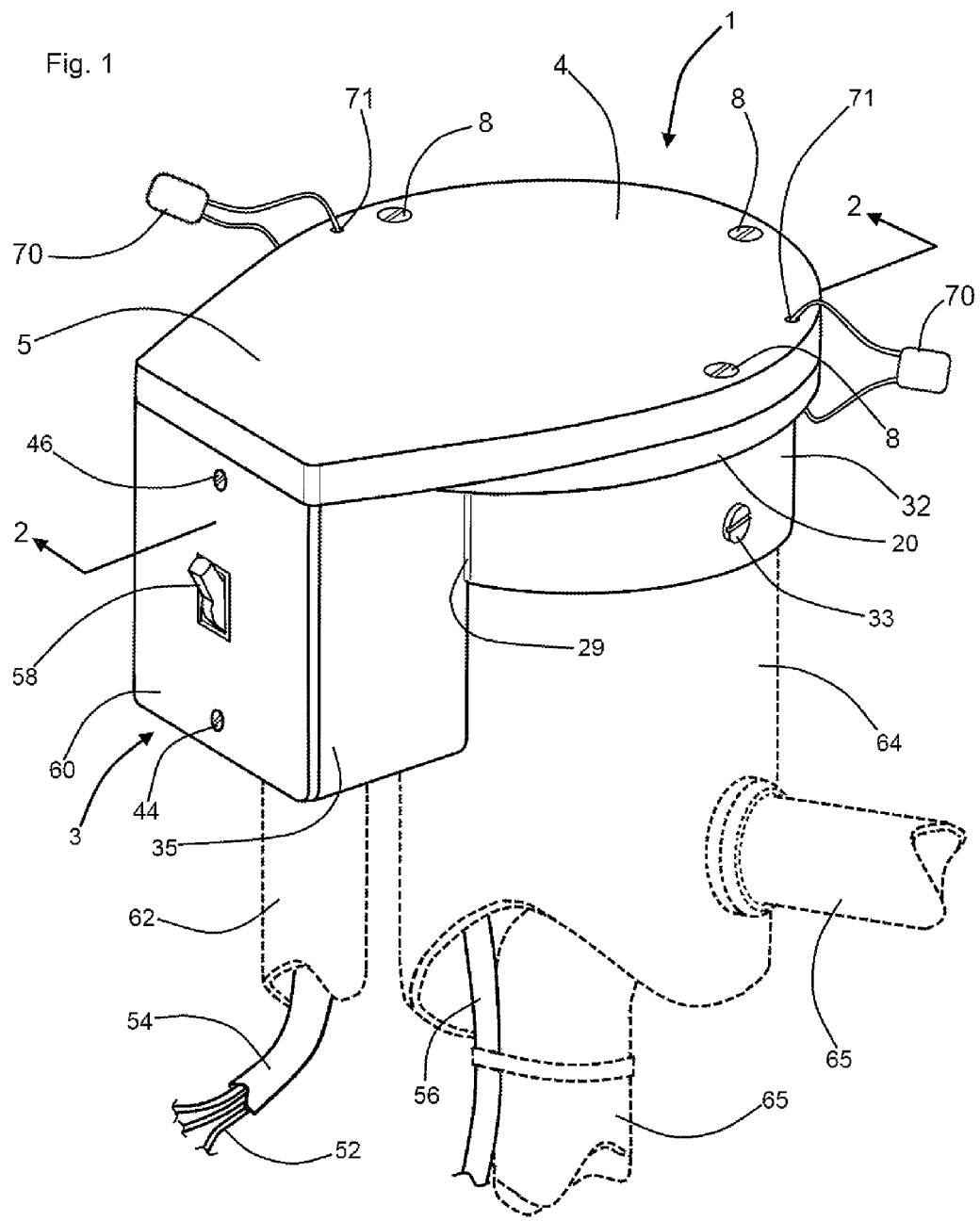
FIG. 1 is a perspective view of a preferred embodiment of the instant inventive wellhead adapter.
Figure 2:
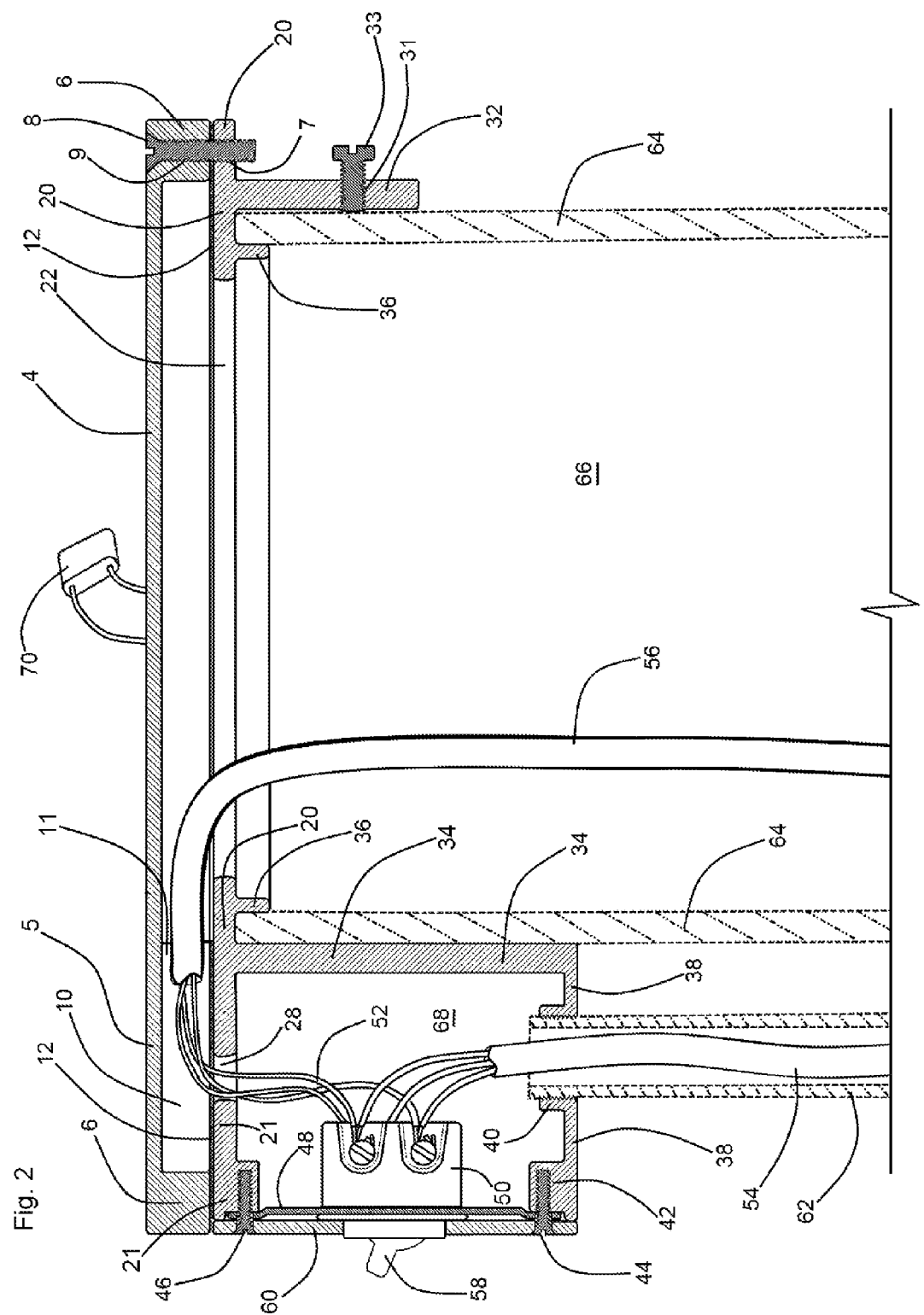
FIG. 2 is a sectional view as indicated in FIG. 1.

Referring now to the drawings, and in particular to FIGS. 1 and 2, a preferred embodiment of the instant inventive wellhead adapter is referred to generally by Reference Arrow 1. The wellhead adapter 1 comprises a base plate component 20, the base plate component 20 having a substantially circular rearward end and having a non-circular, forwardly protruding, and forwardly oblongated forward end 21. The forwardly protruding portion 21 of the base plate 20 component advantageously multiply functions as a ceiling or upper wall component of and as side wall suspension supports for a switch box which is referred to generally by Reference Arrow 3. Such forwardly extended portion 21 of the base plate component 20 preferably has a wire passage aperture 28 extending vertically therethrough. A well bore opening aperture 22 preferably extends vertically through the rearward end of the base plate 20. In the preferred embodiment, an annular guide flange 36 is preferably fixedly attached to or wholly formed with the rearward portion of the base plate 20, the outside diameter of such guide flange 36 preferably being closely fitted for nesting receipt within the inside diameter of a casing 64 of a water well. As can be seen in FIGS. 1 and 2, the rearward end of the base plate component 20 is radially outwardly extended beyond the radial outer periphery of the casing 64.

Referring further simultaneously to FIGS. 1 and 2, an annular casing retaining flange 32 is preferably fixedly attached to or formed wholly with the base plate 20, such flange 32 extending downwardly therefrom. The inside diameter of such flange 32 is preferably closely fitted to the outside diameter of the well casing 64. In the preferred embodiment, a forward circumferential portion or segment 34 of the annular casing retaining flange 32 is preferably adapted and configured for multiply functioning as a casing retaining component, as a rear wall component of the switch box 3, and as mounting support for such box's left and right side walls 35. In order to enhance the interior space 68 of the switch box 3, such switch box rear wall/retaining flange forward portion 34 preferably has a downward extension beyond the downward extension of the circumferentially rearward portions of the flange 32. Helically threaded sockets 31 are preferably provided, such sockets 31 extending radially through flange 32, and such sockets 31 receiving helically threaded set screws 33. Upon screw tightening of the set screws 33 against the annular outer surface of the casing 64, the flange 32,34 along with its attached and associated components are securely mounted at the wellhead.

Referring further simultaneously to FIGS. 1 and 2, the switch box 3 preferably further comprises the left and right side walls 35. In the preferred embodiment, mounting means are provided for fixedly attaching rearward ends of the left and right side walls 35 with the annular flange 32, and for fixedly attaching the upper ends of the left and right side walls 35 with the base plate/ceiling component 21. In the preferred embodiment, such mounting means comprise wholly formed joints 29.

Referring further simultaneously to FIGS. 1 and 2, the switch box preferably further comprises a floor 38, such floor 38 preferably forming and providing a conduit port 40 which further opens the switch box 3. In the preferred embodiment, the conduit port 40 is internally helically threaded for secure attachment of a matchingly threaded upper end of a length of electrical wire conduit 62.

Referring further simultaneously to FIGS. 1 and 2, the instant inventive wellhead adapter 1 preferably further comprises a cover plate 4 whose forward end 5 is preferably fitted for overlying and covering the switch box ceiling/base plate forward extension 21, and whose rearward end is preferably fitted for covering the rearward end 20 of the base plate. Just as the rearward end 20 of the base plate includes a radial extension, the rearward end 4 of the cover plate includes a matching radial extension 6. A plurality of helically threaded socket 7, eye 9, and screw 8 combinations preferably extend vertically through the vertically abutting radially extending portions of the base plate 20 and the cover plate 4, such combinations 7,8,9 advantageously providing for secure attachments and removals of the cover plate 4. In order to provide an impediment against unauthorized access to the well's interior 66, vertically aligned eyes or channels 71 preferably extend through the radial extensions of the cover plate 4 and the base plate 20, such aligned eyes 71 receiving fixedly installed security loops 70. A rubber or elastomeric gasket 12 is preferably interposed between the cover plate 4 and the base plate 20.

Referring further simultaneously to FIGS. 1 and 2, the lower or downward aspect of the forward end 5 of the cover plate preferably forms and defines a wire passage conduit 10, such conduit having a rearwardly facing opening 11, and such conduit 10 communicating with the wire passage aperture 28 of which opens the switch box 3. In the formation of such wire passage conduit 10, the switch box ceiling/base plate component 21 further advantageously functions as a conduit floor member.

Referring further simultaneously to FIGS. 1 and 2, in the preferred embodiment, the interior 68 of the switch box 3 preferably opens forwardly, and such interior 68 is preferably sized for housing a single throw electrical switch 50,58, such switch incorporating a mounting strap 48 which vertically spans such forward opening. A switch covering plate 60 is preferably provided, such plate 60 preferably being associated with switch mounting means in the form of helically threaded screws 44 and 46 which extend longitudinally through eyes within the mounting plate 60 and within the strap 48 for engagement within helically threaded sockets 42.

Referring further simultaneously to FIGS. 1 and 2, a matrix of electrically conductive ground and powered wires 52 which are preferably encased within insulators 54 and 56 preferably extends through the conduit 62, thence through the switch box's conduit port 40, thence through the interior 68 of the switch box for operative electrical connection with the switch 50,58, thence upwardly through the wire passage aperture 28 within the switch box's ceiling 21, thence rearwardly through the wire passage conduit 10, thence further rearwardly through such conduit's opening 11, and thence downwardly through the bore opening aperture 22 and into the bore 66 of the casing 64. As shown in FIG. 1, such electrical wires 52 preferably further extend downwardly within the well bore 66, along a column pipe 65 for operative connection with and powering of a submersible electrical water pump (not depicted within views) which is suspended at the lower end of such column pipe 65.

In operation and use of the instant inventive wellhead adapter 1, the switch box 3 is beneficially securely mounted at the wellhead, eliminating any need for a separate and relatively insecure positioning and mount of a detached switch box. The instant inventive adapter achieves desirable mechanical simplicity and economy of structure by causing plate and flange structures to multiply function for adapter support, box wall formation, box wall support, and wire conduit formation.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. An adapter for a wellhead, the well having a casing having an upper end and a submersible electric pump suspended within the casing, the adapter comprising:
   (a) a base plate having forward and rearward ends, the base plate's rearward end being fitted for mounting over the casing's upper end and having a well bore opening aperture therethrough, the base plate's forward end being forwardly oblongated and having a wire passage aperture therethrough;
   (b) an annular casing retaining flange having forward and rearward ends, the annular casing retaining flange being fixedly attached to and extending downwardly from the base plate's rearward end; and
   (c) a switch box having a ceiling, a floor, a left wall, a right wall, and a rear wall, the ceiling comprising the base plate's forward end and the rear wall comprising the annular casing retaining flange's forward end.

2. The adapter of claim 1 further comprising wall mounting means interconnecting the switch box's left and right walls with the base plate's forward end, the wall mounting means further interconnecting the switch box's left and right walls with the case retaining flange's forward end.

3. The adapter of claim 2 wherein the wall mounting means comprise wholly formed joints.

4. The adapter of claim 2 further comprising a cover plate having forward and rearward ends, said ends being respectively fitted for covering the base plate's forward and rearward ends, the cover plate having a lower end defining a wire passage conduit, the wire passage conduit, upon the cover plate's coverage of the base plate, extending from the wire passage aperture to the well bore opening aperture.

5. The adapter of claim 4 further comprising a conduit port, the conduit port opening the switch box.

6. The adapter of claim 5 further comprising an electrical switch mounted operatively within the switch box, and a network of electrical wires operatively interconnecting the electrical switch and the submersible electric pump.

7. The adapter of claim 6 wherein the network of electrical wires extends through the conduit port, through the switch box, through the wire passage aperture, through the wire passage conduit, and through the well bore opening aperture.

8. The adapter of claim 7 wherein the switch box has a forward opening, wherein the electrical switch comprises a strap switch, and wherein the electrical switch's operative mount extends the strap across the switch box's forward opening.

9. The adapter of claim 8 further comprising a switch plate fitted for covering the switch box's forward opening, and removable mounting means positioning the switch plate over the switch box's forward opening.

10. The adapter of claim 4 further comprising radial extensions, the radial extensions extending radially from the base and cover plates' rearward ends, and a plurality of helically threaded screw, eye, and socket combinations, said combinations extending vertically through the radial extensions for removably attaching the cover plate to the base plate.

11. The adapter of claim 10 further comprising a plurality of vertically aligned eyes extending through the radial extensions, and further comprising a plurality of security loops extending through the vertically aligned eyes.

\* \* \* \* \*